United States Patent [19]

Ibanez

[11] 4,031,833

[45] June 28, 1977

[54] INJECTION IRRIGATING PROCESS AND APPARATUS

[75] Inventor: Cuitlahuac Ibanez, Mexico D.F., Mexico

[73] Assignee: Tecnicas de Riego y Abono, S.A., Mexico City, Mexico

[22] Filed: Sept. 25, 1975

[21] Appl. No.: 616,694

[30] Foreign Application Priority Data

Mar. 12, 1975 Mexico .............................. 157111

[52] U.S. Cl. .................................. 111/7.1; 239/315
[51] Int. Cl.² .......................................... A01C 23/02
[58] Field of Search ............ 239/310, 315; 47/48.5, 47/57.5; 111/7.1–7.4

[56] References Cited

UNITED STATES PATENTS

| 952,245 | 3/1910 | Gardner | 47/57.5 |
|---|---|---|---|
| 1,755,445 | 4/1930 | Irish | 111/7.1 |
| 2,016,983 | 10/1935 | Bruce | 111/7.1 |
| 2,214,083 | 9/1940 | Lester | 111/7.1 X |
| 2,306,165 | 12/1942 | Irish | 111/7.1 |
| 2,380,721 | 7/1945 | Bridgen | 47/48.5 |
| 2,505,174 | 4/1950 | Daniels | 111/7.1 |
| 3,042,312 | 7/1962 | Packard | 239/315 |
| 3,083,916 | 4/1963 | Neel | 239/315 |
| 3,199,957 | 8/1965 | Vivion | 239/315 X |
| 3,343,918 | 9/1967 | Moulder | 239/310 X |

Primary Examiner—Robert E. Bagwill
Attorney, Agent, or Firm—Ladas, Parry, Von Gehr, Goldsmith & Deschamps

[57] ABSTRACT

A process and apparatus for injecting water, fertilizers and the like into cultivated ground, comprising a source of irrigating liquid leading through a flexible tube and a flow regulating device to an injecting hollow tubular member, having an enlarged pointed head with a plurality of outlet bores sorrounding the injecting tubular member near the head thereof in order to deliver the irrigation liquid near the root area of a plant under the ground when said tubular member is inserted in the ground, being said tubular member able to receive in its interior in the fluid path a bag having multiple perforations filled with fertilizers, conditioners and the like.

4 Claims, 7 Drawing Figures

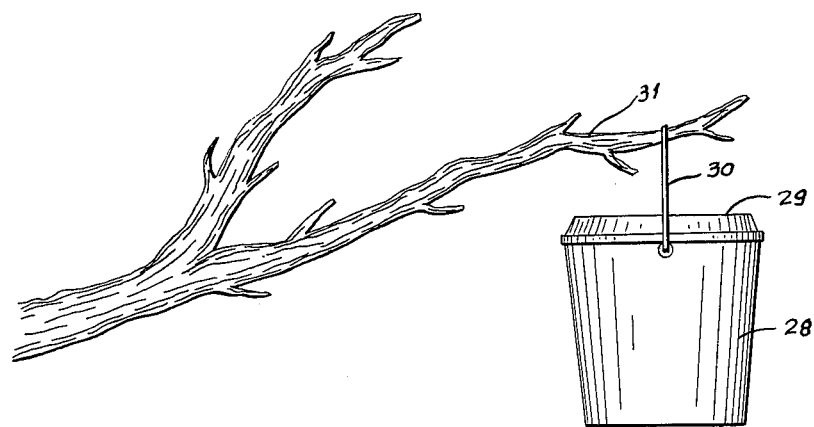
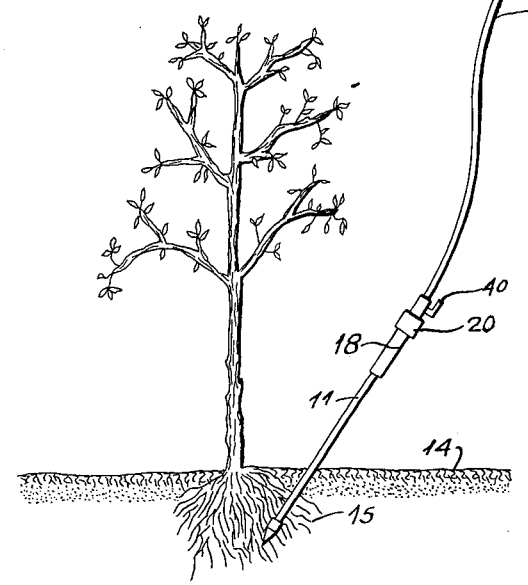
FIG. 1

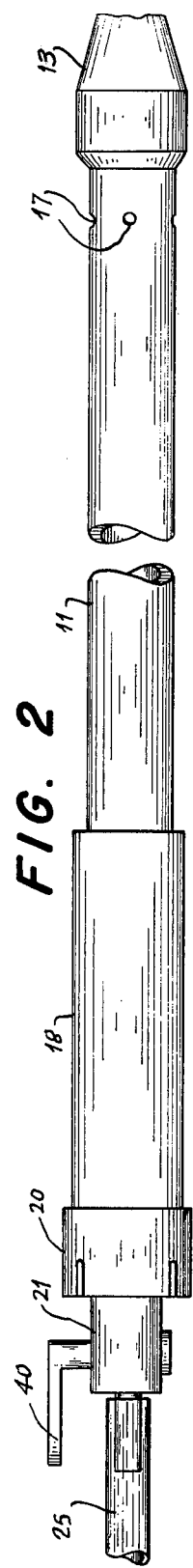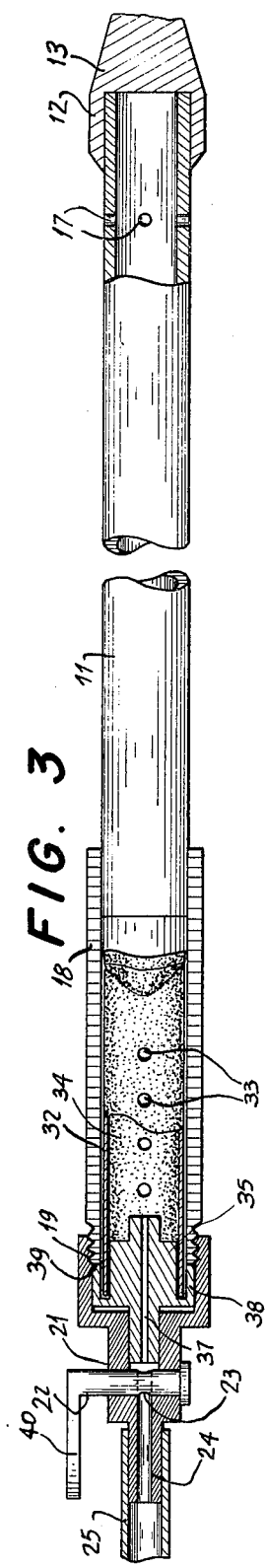

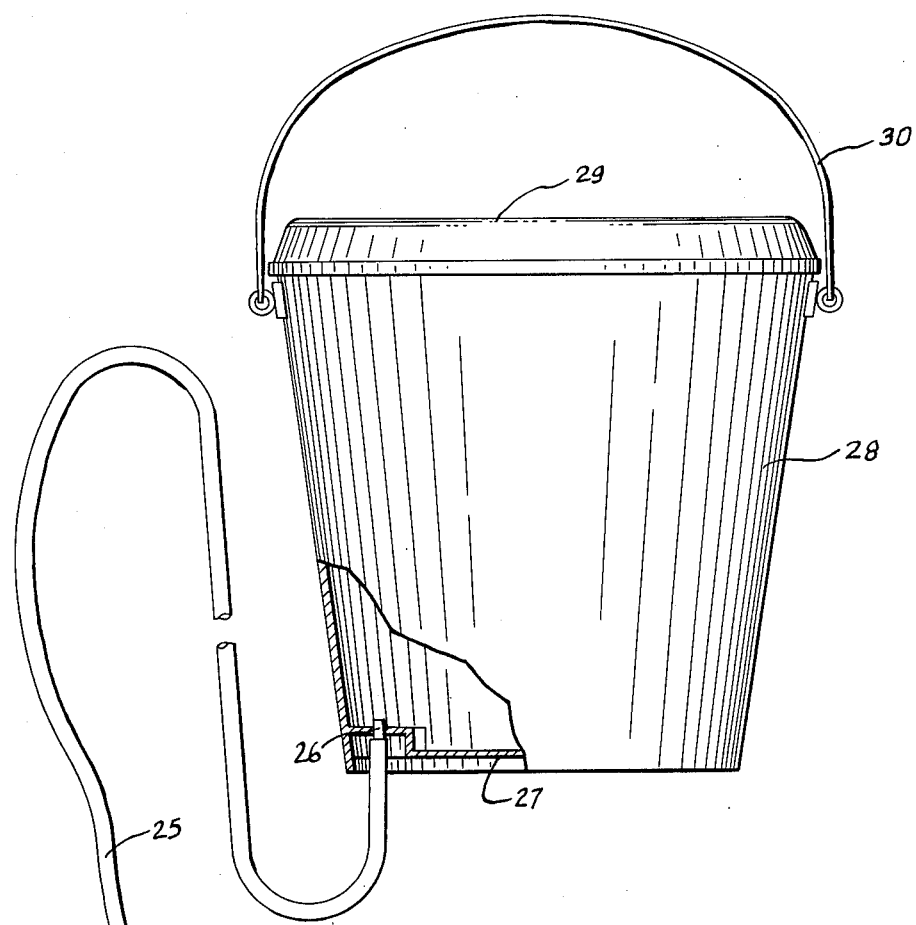
FIG. 4
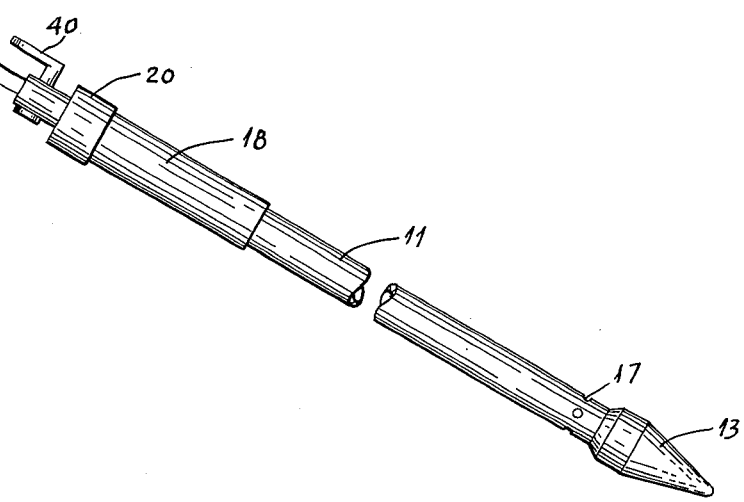

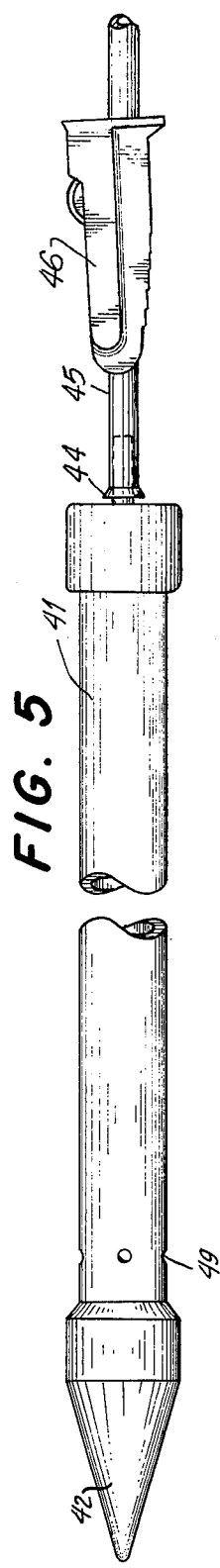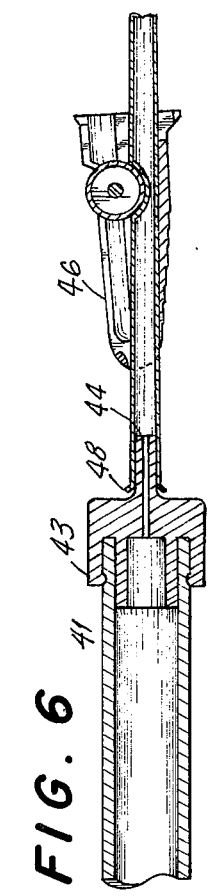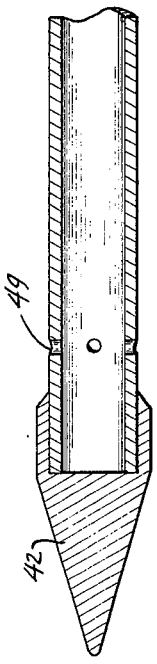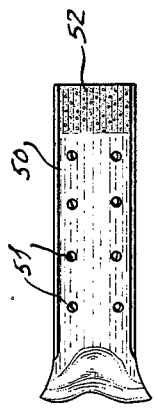

INJECTION IRRIGATING PROCESS AND APPARATUS

BACKGROUND OF THE INVENTION

The problem of exploitation of cultivated land with the least expenditure of irrigation water, fertilizers, conditioners and the like is at the present time one of the most important both because of the scarcity of water, fertilizers and conditioners and because of the need to make agricultural land more productive.

Many systems have been developed for irrigation by means of spraying and drip, which waste large quantities of water, fertilizers, conditioners and the like due to absorption, evaporation, and loss to the wind during the distribution process which is effected on the surface, causing excessive surface wetting which favors the appearance and growth of parasite plants, and infestations of insects and fungus diseases, and which when carried out with large volumes of water may also produce erosion of the land under cultivation.

Furthermore, these traditional systems of irrigation require the use of hand labor for levelling the ground, and hence topographically irregular ground presents serious problems in bringing it under exploitation.

Furthermore, in those irrigation systems in which the water, fertilizers and conditioners are distributed on the surface of the ground, these can be carried off to rivers and contaminate them. Also, since they favor the development of parasite plants, hand labor is required to eliminate the latter.

In addition, because of its design, hydraulic equipment for surface watering by spray or drip is very expensive and delicate, and requires maintenance labor to eliminate the obstructions in tubes and drips because of the mould which develops in them, or other kinds of blockage. Also the regulation and control of flow rate of the drip equipment, and of pressures in the pipes and of the moistness of the ground, proves difficult and on some occasions impossible.

The system of irrigation by drip involves a considerable expenditure for the drippers used, the adaptation of the distribution pipes for a specific diameter for the use of such drippers, the need for calculations which take into account the roughness of the pipes, the pressure losses due to friction, the need for pipe appropriate to the topography of the ground, and the total hydraulic supply available.

Since excessive surface moisture favors the growth of parasite plants, infestations and insects and diseases of fungus origin, it becomes necessary to use pesticides derived from mercury, lead, copper, and other compounds and applied as herbicides, insecticides and fungicides, all of which causes contamination and ecological harm.

SUMMARY OF THE INVENTION

In view of the foregoing, it is an object of this invention to provide a system of irrigation thereby conditioners, fertilizers, insecticides, liquids etc. are applied directly to the zone of the root of the plants with no hindrance or limitation due to topographic, edaphological or hydrological factors.

Another object of this invention is to supply a system of irrigation by injection in which the fullest use and advantage is obtained from the scarce and unevenly distributed hydrographic resources for agriculture, increasing by millions of hectares the area which can be put to use over that which can be exploited with the traditional systems of irrigation, using the same resources and avoiding waste.

With the system of irrigation by injection of the present invention it is possible to apply agricultural exploitation to land even where there are topographic irregularities, semidesert climates, and in general to all kinds of ground which is unproductive because it is in zones which are high, broken, or stony and present serious obstacles to irrigation.

Another object of this invention consists of administering the liquid providing irrigation, conditioning, fertilizers and insecticides directly to the subsoil, since there is no waste, no evaporation, no entrainment in air currents, no danger of rain washing them away to contaminate rivers or favoring the growth of parasite plants, all of which would prevent the appropriate nutrition of the zone of the root of the plants cultivated.

Still another object of this invention consists of providing a system of irrigation by injection in which no manual labor is required for levelling the land, maintaining and cleaning irrigation canals, or for eliminating weeds or parasite plants, and in which the application of pesticides, insecticides and fungicides is not needed, since irrigation by injection instead of on the surface does not promote the development of such parasite plants and insects.

In one of the embodiments of this invention gravity alone is used for the injection of the water, thereby making unnecessary expensive distribution networks, in which keeping pressure and water flow uniform calls for motors, compressors, pressure gauges, filters, regulators, etc.

An additional object of this invention is the provision of a system of irrigation by injection whereby the danger of erosion of the land under cultivation is eliminated, since the erosion is directly related to the volumes of water used, the velocity of the current and the slope of the land.

Another object of the present invention is to provide a system of irrigation by injection which eliminates significant costs by comparison with drip irrigation, since it does not require a complicated hydraulic design or drip feeds, or manual labor to remove the obstructions in pipes and drip feeds because of the mould forming therein, or for other like reason.

Still another object of this invention is to provide a system of irrigation by injection which is produced from a material which resists atmospheric and climatological damage, which is not subject to oxidation or corrosion and which is not subject to attack by insects or rodents, which does not require specialized repair nor expensive manual labor, because of the ease with which it is installed, and because obstructions caused by the development of mould in it do not occur.

It is still a further object of this invention to provide a system of irrigation by injection comprising a cartridge or hollow tubular portion ending in an enlarged head with a pointed tip, said cartridge or hollow tubular portion including certain orifices located near the said head, the cartridge having a removable hollow tubular portion or cap connected to a flexible tube which can in turn be connected at its other end to a tank or bucket or otherwise to a distribution tube for irrigation liquid, including flow regulators for the irrigation fluid which is fed to the cartridge, and which may have in its interior bags having measured quantities of soil conditioner, fertilizer or the like, or alternatively such additives can be put into the water beforehand. The said cartridge or hollow tubular portion with the enlarged head ending in a point is inserted by jamming it into the immediate vicinity of the plant which it is desired to irrigate, in such a manner that the orifices will be near the root zone of the plant, and thereby when the flow regulator is actuated the irrigation fluid can be supplied directly to the plant. In the embodiment in which a bag with conditioner, fertilizer or the like is inside the cartridge or hollow tubular portion, the passage of the irrigating fluid therethrough will pick up the dosage included in the bag and deliver it to the plant satisfactorily. The conditioner, fertilizer or the like can of course be added to the tank or bucket in which the irrigation liquid is stored.

These and other objects to be achieved through the application of the present invention will be more fully understood and appreciated in the reading of the following description, which refers to the accompanying drawings of the preferred embodiments of the invention.

BRIEF DESCRIPTION OF THE DRAWINGS

FIG. 1 is a partially schematic view which illustrates one of the embodiments of the system of irrigation by injection of the present invention.

FIG. 2 is a view in broken vertical elevation of an apparatus for injecting water, fertilizers and the like of the present invention.

FIG. 3 is a view similar to that of FIG. 2 having certain conventional sections which show the internal parts making up one embodiment of the present invention.

FIG. 4 is a view showing the apparatus for injecting water, fertilizers and the like, in the embodiment illustrated in FIGS. 1 to 3, illustrating by means of a conventional section the manner in which it is connected to a bucket which contains the irrigation fluid.

FIG. 5 is a view in broken vertical elevation similar to that of FIG. 2, which illustrates another embodiment of the apparatus for injecting water, fertilizers and the like of the present invention.

FIG. 6 is a view in longitudinal section of the embodiment of the apparatus shown in FIG. 5, with the object of showing the internal parts which make up the apparatus.

FIG. 7 is a view in vertical elevation of an embodiment of the perforated bag having inside it the appropriate dosage of conditioners, fertilizers and the like, which is intended for placement in the path of the flow of the irrigation liquid in order to administer the dosage by entrainment to the desired plant.

DETAILED DESCRIPTION OF THE INVENTION

The improved procedure of the present invention for injecting water, fertilizers and the like into cultivated ground consists of inserting below the surface of the ground and in the immediate vicinity of a given plant a part of the trajectory of the irrigation flow in such a manner that both the water required by the plant and the fertilizers, conditioners and the like will be delivered directly to the zone of the root of the plant; the quantity of the irrigation liquid can be limited and can be administered from a place near to the plant or alternatively from a suitable distribution line.

To carry out the said procedure of irrigation by injection, in one embodiment of the invention the apparatus illustrated in FIGS. 1 to 4 is used, comprising a cartridge or hollow tubular portion 11, which ends in a head 12 having a larger external diameter than the said tube 11 and which ends in a point 13, which can be inserted into the ground 14 to a location near the zone of the root 15 of a plant 16; the said cartridge or tubular portion 11 has at its end near head 12 a plurality of orifices 17, through which the irrigation liquid is supplied to the root 15 of plant 16; at the opposite end of the tubular portion 11 there is included in this embodiment of the invention an enlargement of tube 18, an upper portion or collar of which carries thread 19, to which is attached a threaded cover 20 having an axial projection 21 which is traversed by rod 22 in which there is a perforation 23 the diameter of which is practically the same as the inner diameter of a tube 24 which is the continuation of axial projection 21 of threaded cover 20; tube 24 is suited for receiving by pressure attachment a hose or flexible tube 25, which is connected at its other end to a tube 26 which is inserted in the bottom 27 of a bucket or receptacle, within which the irrigation fluid is stored; said bucket 28 may include a cover 29 and a bail a handle 30 which allows it to be hung on branch 31 of a nearby tree or on the same plant which is to be watered. In the enlargement 18 of tubular portion 11 is placed a container or bag 32 having certain perforations 33 and having in its interior 34 conditioner, fertilizer or the like, said bag 32 being closed by cap 35 which has axial tube 36 projecting out therefrom, cap 35 having an axial perforation 37 which substantially coincides, in its diameter, with the diameter of perforation 23 of rod 22 which extends through projection 21 of cover 20.

Cap 35 of bag 32 includes enveloping skirt 38, providing a space between itself and the edge up of cap 35, into which the wall of bag 32 is inserted; round edge 39 of skirt 38 bears against the end edges of enlargement 18 of tube 11; axial tube 36 which is part of the cap 35 penetrates inside projection 21 of threaded cover 20.

Thus when hollow tubular component 11 with its pointed head 13 is inserted in the ground near the root 15 of plant 16 which it is desired to irrigate, irrigation liquid is caused to pass from bucket or receptacle 28 which may be covered by lid 29 to prevent any foreign matter from entering, the receptacle hanging by bail or handle 30 or the like from a branch 31 of a nearby tree or the plant itself, in one embodiment of the present invention, so that by gravity the irrigation liquid passes through axial tube 26 which inserted into bottom 27 of the receptacle, and from here passes through the hose or flexible tube 25, passes through threaded core 20, through tubular enlargement 18, through hollow tubular portion 11 inserted in the ground. Passage of the irrigation fluid is dependent on the position of pin 22 which extends through said threaded cover 20, when the bore 23 of said pin is aligned with the bore in tube 24 of the said threaded head 20; when the pin 22 is turned at a certain angle it will prevent the flow of the irrigating liquid to hollow tubular piece 11; pin 22 is rotated by means of small handle 40 connected to one of the ends of pin 22. When valve pin 22 allows the flow of irrigating liquid through bore 37 of cap 35 of bag 32 which contains the conditioner, fertilizers and the like, the irrigating liquid carries them by entrainment and they pass through perforations 33 in the said bag 32 and pass into hollow tube 11 and are directed by orifices 17 directly to the root area 15 of the plant 16.

In this embodiment of the invention the flow is effected by mere gravity and does not require pumps, motors or special distribution lines, so that this embodiment is of special value for farm people of limited means. In addition, since the irrigation is by injection and takes place at a certain level below the soil 14, there are no surface losses due to evaporation or that might favor the development of parasite plants and fungi, and the irrigation fluid is fully put to use. Furthermore since the bags 32 containing the conditioners and fertilizers are already filled, the user has only to place them in their proper position and put the apparatus into operation injecting the irrigation fluid. These bags 32 which contain the conditioners and fertilizers and the like can either be filled by the user or can be sold with a specific filler for a specific kind of plant.

In FIGS. 5 and 6 another embodiment is illustrated of the apparatus for injecting water, fertilizers and the like of the present invention, in which the apparatus is made up of a hollow tubular portion 41 of uniform diameter which at one end includes the enlarged head 42 ending in a point and at the other end a pressure cover 43 having a projecting tube 44 able to receive the end 45 of a flexible hose as illustrated in the preceding embodiment. In this case the flow of irrigation liquid can be regulated by using a roller clamp 46 of conventional type; the end lip 47 of the tubular portion 41 may be slightly tapered to facilitate the insertion under pressure of cover 43, which has a perforation 48 extending through it and through projecting tube 44; in this embodiment the source of supply of the liquid for irrigation may be a receptacle or bucket as in the preceding embodiment, or alternatively a distribution line delivers the liquid through flexible tube 45 controlled by the roller valve 46 or any other like means to the inside of tube 41, which is inserted into the area adjoining the plant which it is desired to irrigate; from the inside of the tube it passes through orifices 49 directly to the root zone of the plant. In this embodiment a bag 50 previously filled with the conditioner, fertilizers and the like can be inserted into tubular portion 41, the bag having a plurality of perforations 51 to allow the contents to be carried to the plant; this bag may have any cap as for example a porous material 52 which permits liquid to flow through it, or the conditioners and fertilizers can be added to the irrigation liquid at the source of the latter.

The object of illustrating the latter embodiment is to emphasize that the most important part of the invention is the insertion of a tubular member with a pointed head in the ground adjoining the plant, placing perforations in the ends of these tubular members near the root of said plant. This indicates that any modification in form or detail affecting the design of the tubular member and the valve for controlling flow of the irrigation liquid as well as the fact of inserting or not inserting a bag containing a charge of conditioner and fertilizers inside the tubular member or the fact that the liquid is supplied from a receptacle or from a distribution line, will fall within the scope and spirit of the present invention.

I claim:

1. An apparatus for injecting liquid into cultivated ground, comprising a container for containing liquid to be injected, said container being supported a short distance above the ground, a flexible tube having first and second ends of which the first is connected to the container for drawing off liquid therefrom, and a unitary rigid tube having first and second ends and having at its first end a pointed head member of larger external diameter than the rigid tube to facilitate insertion of the rigid tube into the ground and also having near the pointed head member a plurality of perforations to enable liquid in the interior of the rigid tube to enter the ground in the region of the pointed head member when the rigid tube is inserted in the ground, and the apparatus also comprising a connection member threadedly securing the second end of the flexible tube to the second end of the rigid tube and being removable from the rigid tube to afford access to the interior thereof, a bag having a rigid perforated cap and a pervious wall and containing fertilizer or conditioner and being adapted to be inserted in the interior of the rigid tube when the connecting member is removed therefrom and to be retained in the rigid tube with the perforated cap under the connecting member when the connecting member is replaced, and regulating means to control flow of liquid from the container to the interior of the rigid tube by way of the flexible tube and the connection member.

2. An apparatus as claimed in claim 1, wherein the connection member is pressure mounted on said second end of the rigid tube and includes a spigot portion which is formed with a bore extending therethrough and which is fitted in said second end of the flexible tube.

3. An apparatus as claimed in claim 1, wherein the connection member is threadedly connected to said second end of the rigid tube, and the regulating means comprises a rotatable transverse valve pin.

4. An apparatus as claimed in claim 1, wherein said bag has a porous cover which permits the passage of liquid therethrough.

* * * * *